Jan. 11, 1949.  M. FROMMER  2,459,021
BINOCULAR LOUPE
Filed Nov. 10, 1944  2 Sheets-Sheet 1
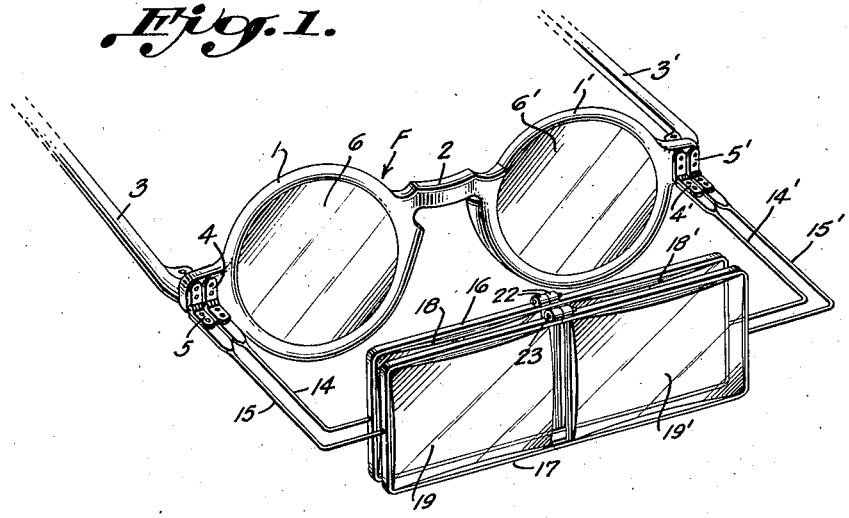
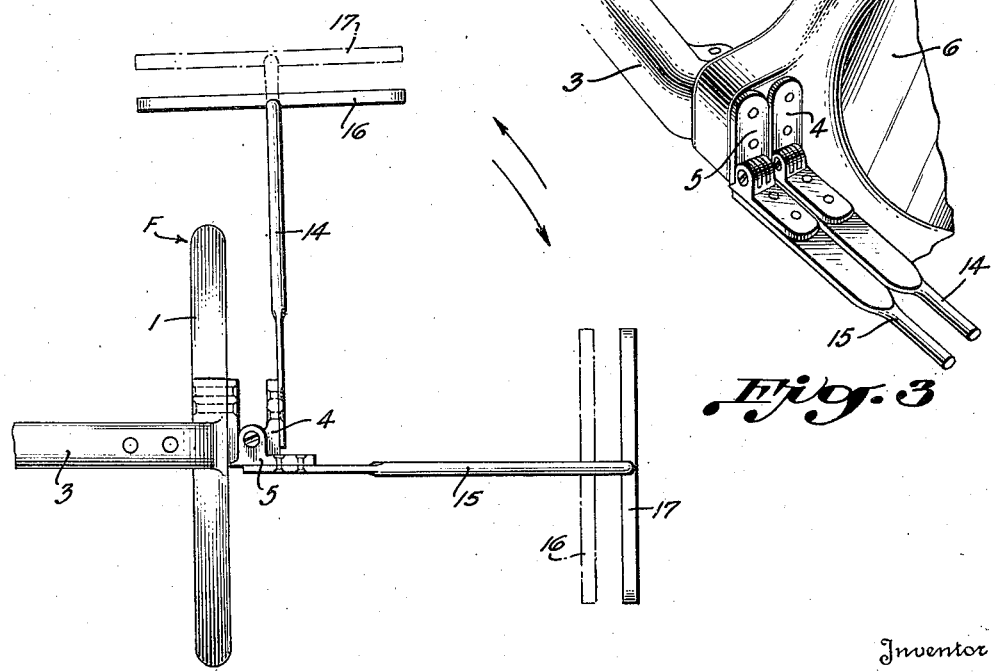
Inventor
MOSES FROMMER Jan. 11, 1949.  M. FROMMER  2,459,021
BINOCULAR LOUPE
Filed Nov. 10, 1944  2 Sheets-Sheet 2
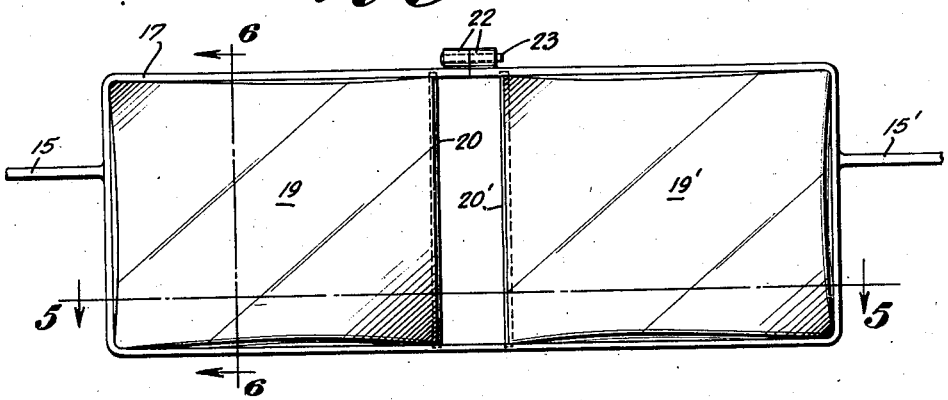
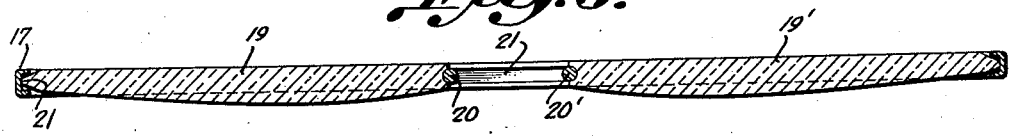
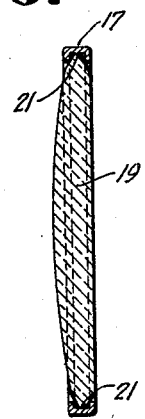
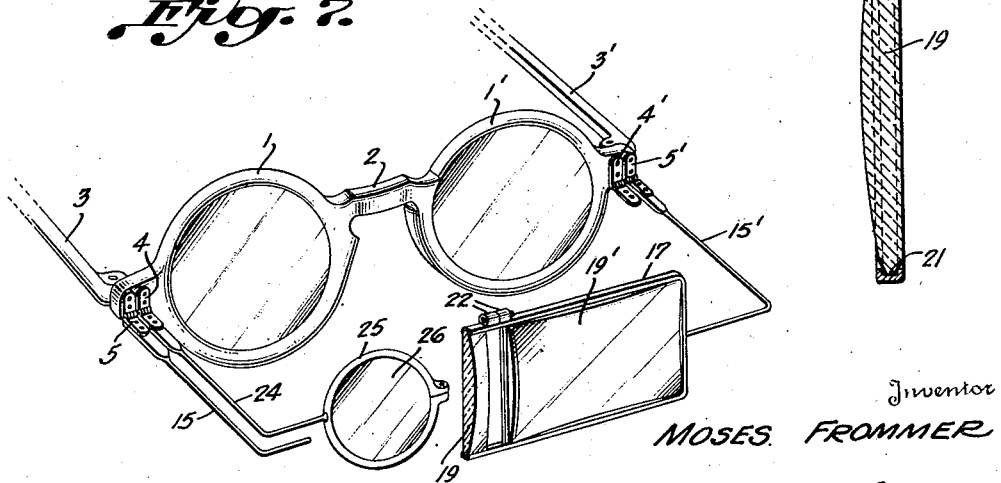
Inventor
MOSES FROMMER Patented Jan. 11, 1949

2,459,021

UNITED STATES PATENT OFFICE 2,459,021

BINOCULAR LOUPE

Moses Frommer, New York, N. Y.

Application November 10, 1944, Serial No. 562,816

1 Claim. (Cl. 88—41)

This invention relates to binocular loupes and more particularly to binocular loupes enabling third dimensional vision of varying degree corresponding to different adjustments of the focal lengths of the loupe and its magnification powers.

It is the object of the present invention to provide a binocular loupe which is rugged and sturdy in construction, but, nevertheless, light in weight, and which may be mounted upon conventional spectacle frames containing ophthalmic lenses corresponding to the vision correction of the operator, if such is necessary. This objective is attained by the balanced mounting of the magnifying loupe from the sides of the spectacle frame rather than from the mid-portion thereof at the nose bridge of the frame.

It is a further object of the invention to provide a loupe embodying a plurality of magnifying lenses each of which may be used alone to obtain different magnifications at different focal lengths, or which may be combined to obtain one or more lense systems producing different magnifications at one or more other focal lengths.

It is a further object of the invention to provide a binocular loupe which is comfortable to wear on account of its light weight and in which the magnifying lenses are capable of being swung conveniently from an operative to an inoperative position and vice versa, without removal of the spectacle frame from the eyes of the operator selectively to permit normal vision or magnified vision.

It is a further object of the invention to provide a binocular loupe which may be applied to existing spectacle frames or which may be built economically in the course of construction of such spectacle frames. While provision may be made for the application of more than one binocular loupe to the spectacle frame, a lesser number than those for which the frame is constructed may be employed and different binocular loupes may be applied to the frame interchangeably, depending upon a change in needs of the operator.

It is a further object of my invention to provide a hinge mounting upon each side of the spectacle frame for the selective mounting of a monoloupe for either the right eye or left eye which may be used in conjunction with or to the exclusion of the binocular loupe in accordance with the present invention, and which, like the binocular loupe, is capable of rotational movement about a horizontal axis to bring the monoloupe within the range of vision from a position above the eyes of the wearer.

It is a further object of the invention to provide a rugged and secure mounting for each of the lenses of the one or more binocular loupes.

Other objects and purposes will appear from the detailed description of the invention following hereinafter, taken in conjunction with the accompanying drawing, wherein Fig. 1 is a perspective view of a preferred embodiment of the binocular loupe in accordance with the present invention;

Fig. 2 is a side view of Fig. 1 showing the selective positioning of the magnifying lenses between operative and inoperative positions;

Fig. 3 is an enlarged perspective view showing the hinge mountings on the spectacle frame for pivotally supporting the magnifying lens frame;

Fig. 4 is a front elevation of one of the binocular loupes showing the mounting of the individual lenses therein;

Fig. 5 is a horizontal sectional view along line 5—5 of Fig. 4;

Fig. 6 is a vertical sectional view along line 6—6 of Fig. 4; and

Fig. 7 is a perspective view of another embodiment of the invention consisting of a combination mono-loupe and binocular loupe either individually operable or selectively combinative with each other.

In the drawings is shown a spectacle frame F of conventional construction, which, for the sake of illustration, has been shown as a frame formed of non-inflammable plastic, consisting of eye frames 1 and 1' bridged by the nose bridge 2 and provided with temples 3 and 3' pivoted to the eye frames 1 and 1', respectively. The temples may be pivoted at the central or upper portions of the end pieces of the eye frames and in any other manner known in the trade. The eye frames 1 and 1' may contain ophthalmic lenses 6 and 6' if the normal vision of the operator requires correction; else these frames may be left blank, or may contain plain glass lenses.

A plurality of hinges are affixed to the forward part of each of the end pieces of the spectacle frame for the purpose of mounting the binocular loupes for rotation about substantially horizontal axes along a coaxial line. In the illustrated embodiment, two sets of hinges are provided, an inwardly disposed set 4 and 4' and an outwardly disposed set 5 and 5'. If more than two magnifying lens frames are to be provided, additional hinges may be mounted on the front of the frame. Bars 14 extend forwardly from the hinges 4 and 4' and support a frame 16 for rotation about the horizontal axis of the hinges so that this frame may be disposed forwardly of the spectacle frame or upwardly thereof as shown in Fig. 2 in the inoperative position thereof. Likewise, bars 15 and 15' of slightly greater length than bars 14 and 14', respectively, support the frame 17 at the free forward end thereof for selective operation either in front of or above the spectacle frame. Suitable lenses 18 and 18' are mounted in frame 16 and an additional set of lenses 19 and 19' are mounted in frame 17. The lenses are spaced apart a predetermined distance by means described in greater detail below, which spacing is dependent upon the interpupillary distance between the eyes of the operator, which may be adjusted at the time of fitting of the magnifying lenses in the course of their initial preparation.

Figs. 4, 5, and 6 show in detail the mounting of the lenses individually to obtain a sturdy and economical construction. In these figures, frame 17 is shown constructed of metal framing having a shallow channel 21 therein which is adapted to receive the beveled top and bottom and temporal edge of each lens. The nasal edge of each lens is confined by vertical wires 20 and 20' cooperating with grooves in the respective edges of the lenses. The spacing between these wires extending between the top and bottom of the frame corresponds to the desired interpupillary distance between the eyes of the wearer. As shown, the frame may be formed from a single piece of channeled material which may be maintained in integrated condition by means of internally threaded end protuberances 22 having a threaded bolt extending therethrough. Of course, the frame may be constructed in any other manner known in the art.

In one form of execution of the invention, frame 17 with the lenses 19 and 19' therein may have a focal length of 13" with a magnification of 1½x. The inner frame 16 with the lenses 18 and 18' therein may have a focal length of 8" with a magnification of 2x, resulting in a smaller field of vision than is obtainable with the lenses in the outer frame. When both frames are in operative position, as shown in Fig. 1, a 5" focal length is obtained with a magnification of 3x, resulting in a still smaller field of view and producing even more detailed visibility.

The binocular loupe frames are capable of convenient manipulation from operative to inoperative position from either the right or left side of the operator to adjust the vision to any of the three adjustments described above, or into the fully inoperative position when normal vision is desired to be had. A larger number of combinations may be obtained by the provision of more sets of magnifying lenses.

The mounting of one or more of the binocular loupes at the sides of the spectacle frames remote from the nasal bridge results in a sturdy structure presenting many advantages over the arrangements known heretofore wherein such binocular loupes have been mounted from the bridge of the spectacle frame.

The dismounting of the frames from the hinge assemblies is a simple matter to obtain different lens combinations. Of course, the lenses in the loupes are so mounted that a stereoscopic vision is attained, which may be conveniently adjusted for focal length and magnifying power, depending upon the specific needs of the operator from time to time.

Fig. 7 illustrates a different embodiment of the invention having a high degree of utility in certain specialized work as in the jewelry repairing and watchmaking and repairing fields, or other fields wherein high magnifications are required. In this construction a monoloupe 25 mounted at the forward end of arm 24 is pivotally mounted on hinge 4 for selective cooperation with the binocular loupe 17 with lenses 19 and 19' thereon. The circular lens 26 in the frame of the monoloupe 25 may have a 10x magnification for work requiring close observation. The frame 25 may be swung upwardly out of the field of vision without any trouble and is always at hand whenever sight therethrough is desired. A similar monoloupe may be mounted for vision through the left eye if such is desired.

Although my invention has been illustrated as applied to a spectacle frame of plastic material, it is also applicable to frames made of metal or any other suitable structural materials.

While I have described my invention as embodied in a specific form and as operating in a specific manner for purposes of illustration, it should be understood that I do not limit my invention thereto, since various modifications will suggest themselves to those skilled in the art without departing from the spirit of my invention, the scope of which is set forth in the annexed claim.

I claim:

A binocular loupe comprising a spectacle frame formed of a pair of eye frames containing ophthalmic lenses, a nasal bridge extending therebetween and a temple pivotally mounted on each end piece of the eye frame remote from said bridge, the forward part of each end piece having a pair of horizontally and laterally disposed hinges thereon disposed coaxially on a horizontal axis, a set of bars pivotally mounted about said horizontal axis on the inwardly disposed hinges and supporting a frame between the free ends thereof for a pair of magnifying lenses, a set of bars of slightly greater length than said first-mentioned bars pivotally mounted about said horizontal axis on the outwardly disposed hinges and supporting a second frame between the free ends thereof for a second pair of magnifying lenses of different characteristics from said first set, said last-mentioned frames each being capable of positioning separately and together forwardly of the eye frames to obtain three different magnifying effects or above the eye frames into selectively inoperative positions.

MOSES FROMMER.

REFERENCES CITED

The following references are of record in the file of this patent:

UNITED STATES PATENTS

| Number | Name | Date |
| --- | --- | --- |
| 1,212 | Smith | June 29, 1839 |
| 1,086,802 | Beebe | Feb. 10, 1914 |
| 1,864,123 | Conrad | June 21, 1932 |
| 1,831,132 | Rheinberg | Oct. 4, 1932 |
| 1,964,243 | Behr | June 26, 1934 |
| 2,143,431 | Benzinger | Jan. 10, 1939 |
| 2,158,642 | Tartrais | May 16, 1939 |
| 2,193,968 | Kohl | Mar. 19, 1940 |
| 2,300,364 | Wagner | Oct. 27, 1942 |

FOREIGN PATENTS

| Number | Country | Date |
| --- | --- | --- |
| 248,851 | Germany | July 3, 1912 |
| 545,723 | Germany | Mar. 4, 1932 |